Figure 1:
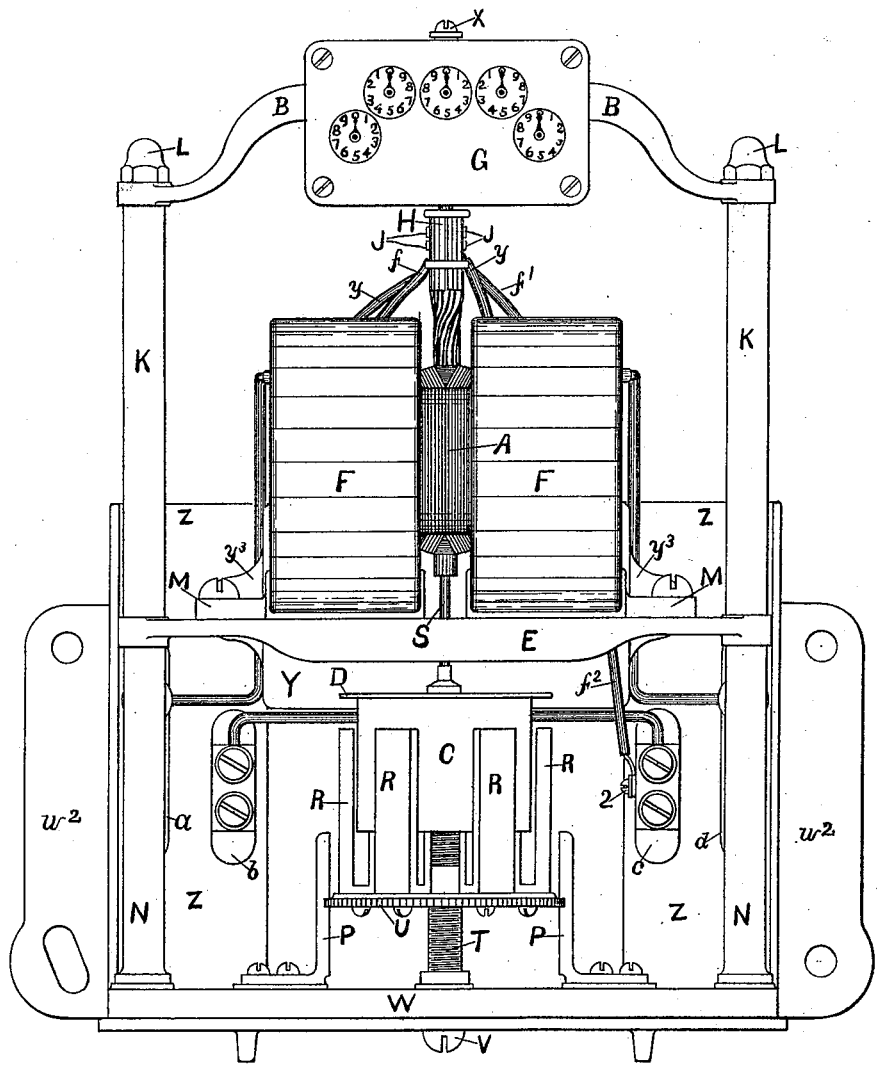

(No Model.)  T. DUNCAN.  4 Sheets—Sheet 1.
ELECTRIC METER.

No. 518,311.  Patented Apr. 17, 1894.

WITNESSES:  Thomas Duncan INVENTOR:
John E. Dalton
John J. Muir  By Chapin & Denny
HIS ATTORNEYS.

(No Model.) 4 Sheets—Sheet 3.

T. DUNCAN.
ELECTRIC METER.

No. 518,311. Patented Apr. 17, 1894.

WITNESSES:
John E. Daeton.
John J. Muir

INVENTOR:
Thomas Duncan

BY Chapin & Denny
HIS ATTORNEYS.

(No Model.)  4 Sheets—Sheet 4.

T. DUNCAN.
ELECTRIC METER.

No. 518,311.  Patented Apr. 17, 1894.

WITNESSES:
John E. Dalton
John J. Muir

Thomas Duncan INVENTOR:

BY Chapin & Denny
HIS ATTORNEYS.

UNITED STATES PATENT OFFICE.

THOMAS DUNCAN, OF FORT WAYNE, INDIANA.

ELECTRIC METER.

SPECIFICATION forming part of Letters Patent No. 518,311, dated April 17, 1894.

Application filed August 2, 1893. Serial No. 482,220. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention relates to that class of meters known as recording wattmeters, or more properly joulemeters, and which are used in conjunction with either direct or alternating current systems of supply, for registering the amount of electrical energy consumed in any given time.

One of the elements of my invention consists in the construction of the damping or dragging device, upon which the motor part operated by the current passing through it, is caused to do work, so that the resulting speed or motion will be a correct representation of the amount of energy being consumed or passing through the meter. In this construction referred to, I have eliminated two serious drawbacks which have hitherto been very detrimental in meters using the Arago disk drag or Foucault current damping arrangement, viz: in preventing the reaction of the induced currents in the moving conductor, from repelling or stemming back the flux of the energizing magnets, and causing them to short-circuit and decrease their number of lines of force acting upon said conductor, thereby reducing the drag as the speed of the motor increases, causing the reading of the meter to be inaccurate, since the lines of force acting upon the drag armature must be constant at all speeds. The other drawback which I have overcome is the adjustment of the magnets in standardizing the meter. This I find to be a very important part of the operation, since without some micrometric arrangement it becomes very tedious and uncertain.

My invention further consists in the application of a suitable condenser to prevent sparking at the commutator of the motor, and at the same time eliminating all traces of inductance, or the counter-electromotive force of self-induction, from the armature circuit representing the applied electromotive force to be measured, thereby making the readings or indications of the meter represent the true or actual energy expended. Without the latter the indications of a commutated or other Joule or energy meter cannot be correct when measuring alternating currents, since there must be a certain amount of self-induction in the armature or volt circuit, thereby causing a lagging or time constant between the maximum values of the series or ampère circuit and the said armature or volt circuit.

My invention also consists in the use and application of a high resistance, shunted around the terminals of the armature in lieu of a condenser, which also eliminates the sparking by forming a discharge circuit when the armature circuit is opened from any cause, such as in passing from one segment to another.

Other features of my invention are the simplicity of its operation, the ease with which it can be taken apart for repairs and assembled, and the small cost of manufacturing. These features will be more particularly hereinafter described in detail.

In the accompanying drawings similar letters and figures refer to similar parts throughout the several views, and in which—

Figure 2:
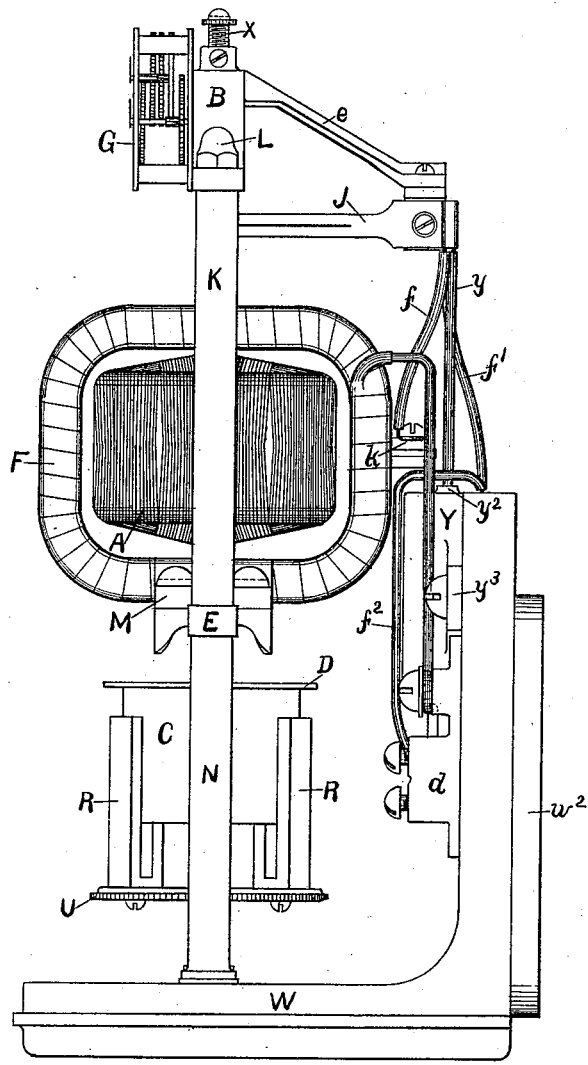
Figure 3:
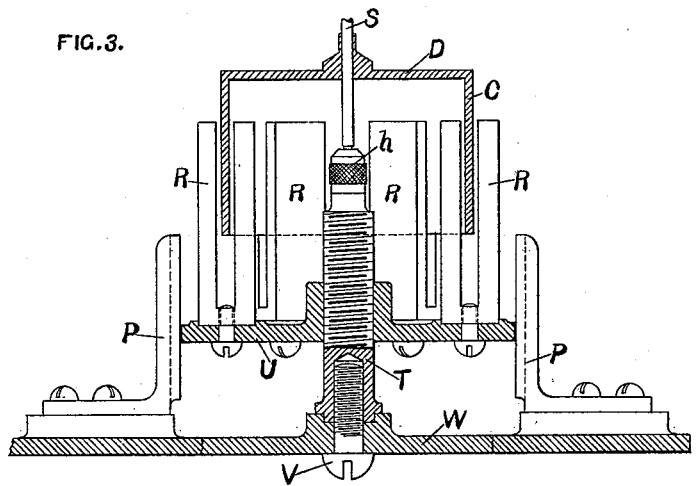
Figure 4:
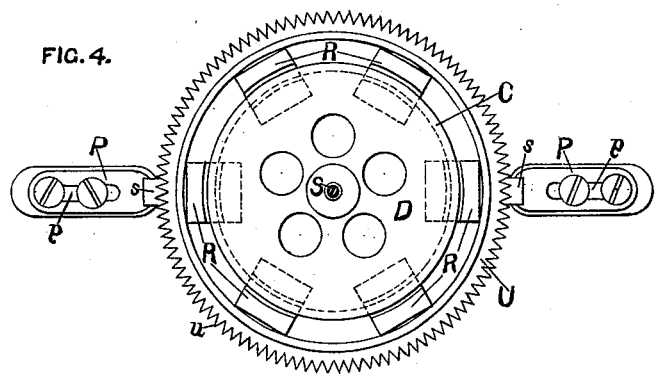
Figure 5:
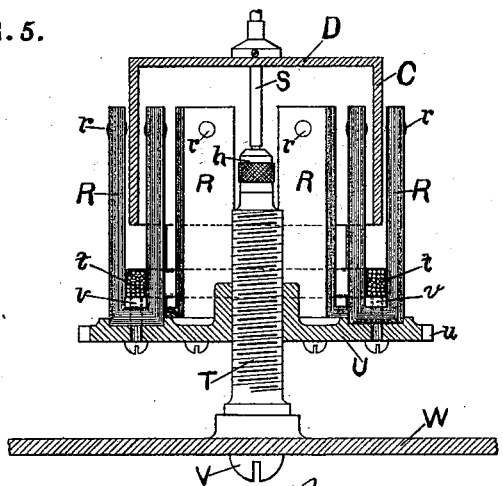
Figure 6:
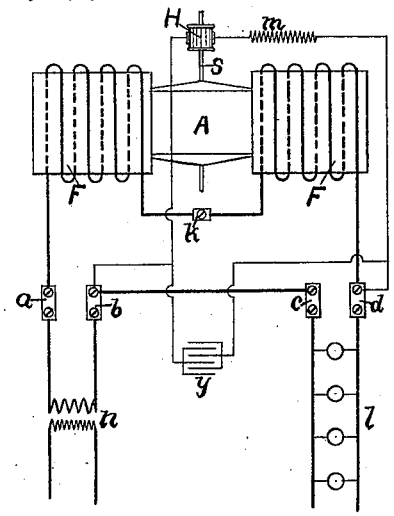
Figure 7:
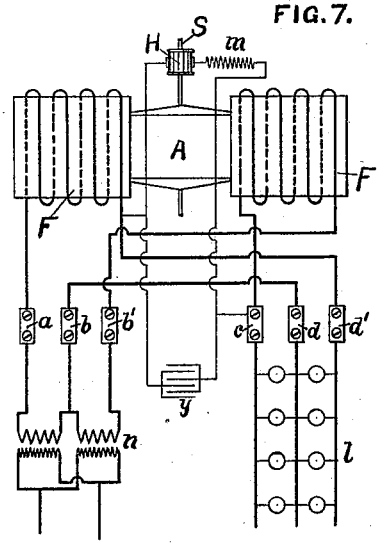
Figure 8:
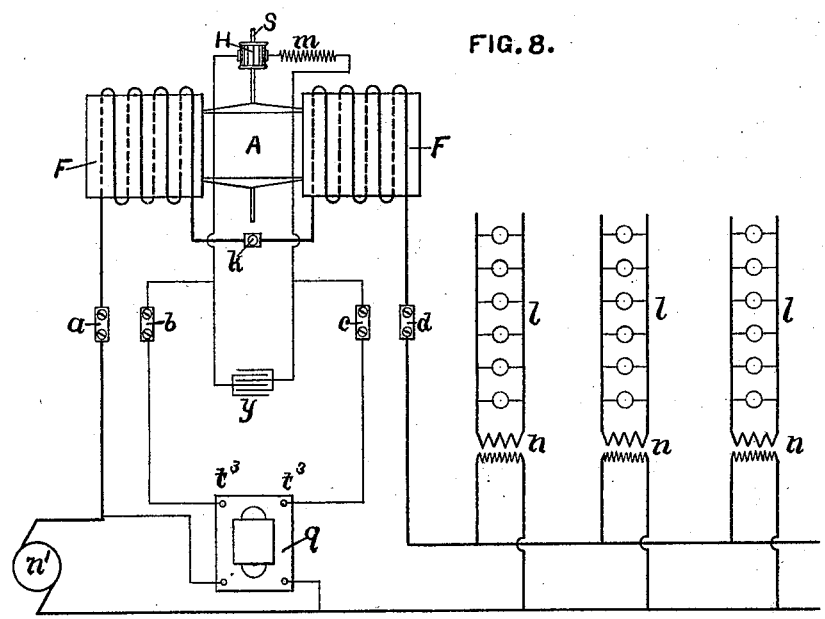

Figure 1, is a front elevation of my improvement. Fig. 2, is a side elevation of the same showing the general elements of construction. Fig. 3 is a sectional elevation of my improved damping device showing the manner in which it is adjustable upon the upright post T. This figure also shows the method of clamping the magnets when the requisite retardation has been obtained. Fig. 4 is a plan view of the said damping device. Fig. 5 is another view of the same in section, having electro-magnets constructed of thin sheets of soft iron or steel. Figs. 6, 7 and 8 are diagrammatic sketches showing the different methods of connecting when used with two wire, three wire, and primary circuit systems of distribution respectively.

Referring to Figs. 1 and 2 A is the armature carrying the current of the pressure or volt circuit and which rotates between the two series or ampère coils F. These series coils are connected in the work circuit so that all the current has to pass through them. In the accompanying figures they are shown connected in series but they may also be connected in multiple arc. Their outer ends or terminals are connected in circuit at the binding posts $a$ and $d$, while their inner ends are joined together at $k$, shown in Figs. 2, 6, 7, and 8. The two left hand binding posts $a$ and $b$ are connected to the line or generator terminals, and the other or left hand posts $c$ and $d$ to the lamp or work circuit. The armature or pressure circuit A is connected in shunt across the system of supply, having a noninductive resistance in series therewith. If said resistance does contain any degree of inductance a condenser can in like manner be used in conjunction with it, as is applied to the armature hereinafter described.

The method of connecting the armature across the terminals of the circuit is accomplished in the following manner: One of the fine wire terminals $f^2$ is fastened to the binding post C, at 2 in Fig. 1, and from thence it passes to the resistance placed in the back of the meter, immediately behind the condenser Y, then up to one of the brushes J as $f'$ through the armature and back through the other brush J to the other side of the line and terminating as $f$, at the series coils connection $k$. The other fine wires $y$ and $y$ are also connected respectively to the two brushes J and J which rest upon the commutator H, and connect with the condenser Y through the small insulated brushings $y^2$. The condenser is fastened to the two insulating strips Z and Z at each side of the meter by means of the lugs $y^3$, these strips being themselves screwed to the back support of the meter. The binding posts $a$, $b$, $c$, and $d$ are also screwed to these insulating strips Z and Z. To the spindle or shaft S is attached the armature A, also the commutator H and the drag armature C D. The upper end of the said spindle is held in position by the bearing X, the lower end resting upon a jeweled bearing $h$ seated in the top of the threaded post T and shown in Figs. 3 and 5. The disk U which carries the magnets R is held firmly in position by the saw toothed clamps P. The upright post T carrying said disk and magnets is fastened to the base W with the screw V. The lugs $w^2$ with the holes therein are for fastening to a suitable support in practice or when in operation. The two series field coils F are fastened by the clamps M and supported by the cross bar E which rests upon shoulders turned on the vertical standards N and N; these shoulders are made by turning the upper part of the posts N to a smaller diameter, then, when the cross bar E rests upon said shoulder, a tube K equal in thickness to the amount turned off, is slipped down over these posts and rests upon the upper end of the bar E. The upper ends of these vertical posts are threaded, so that when the upper supporting bar B which carries the upper bearing X, the brushes J, the brush holder $e$ and the registering train G, is placed upon the upper ends of the tubes K the whole is then screwed down firmly together with the cap-screws L. The leading in wires from the generator or other source of supply, pass through the base of the meter to $a$ and $b$, so also do the wires leading to the work circuit from $c$ and $d$. The revolutions of the armature or spindle are communicated to the registering train G by means of a worm placed on said spindle, and which meshes with a worm wheel forming part of the mechanism of said registering train but not shown. The fine wires $y$ and $y$, $f$, $f'$, and $f^2$, as shown, are covered with rubber tubing to insure perfect insulation. The two binding posts $b$ and $c$ are connected together by a wire as shown in Fig. 1, this merely serving the purpose of bringing within the meter, the other side of the line or circuit for the purpose of energizing the armature A; the binding posts $a$ and $d$ connecting the series fields, being in the other side of the circuit. These connections will be more clearly understood by reference to Fig. 6 which shows them diagrammatically.

For the purpose of varying the drag or brake force I have mounted upon the disk U a number of permanent magnets made from tungsten-steel and artificially aged so that their permanency may be relied upon for all general purposes and conditions. On the center and top of this disk is cast a boss as shown in Figs. 3 and 5, which is tapped out and made to screw up and down upon the upright and supporting post T. By turning said disk so that it rises up on the post T the magnets R are brought up closer to and envelop more of the cylinder C, thereby increasing the dragging force, since the number of lines of force caused to cut through C have been increased. To reduce the drag the disk is turned in the opposite direction so as to lower the magnets. By this means the smallest and most minute changes possible in the drag can be obtained. Suppose the supporting post T be furnished with a No. 30 thread and the distance between the bases of the saw-teeth or V shaped grooves on the periphery of the disk U to be one sixteenth of an inch, while its diameter is say three inches, then there will be a number of these grooves equal to $3 \times 3.1416 \times 16$ or 150. Therefore, in one single revolution of the disk U it has one hundred and fifty adjusting stops, each representing a change in the drag, and yet only moved through a distance of one thirtieth of an inch, or the height of one thread on the post T. By using a finer thread, of course the variations may be made very much smaller. From the shape of the magnets their field or lines of force almost extend from their base to the upper ends or poles. I have also altered the amount of brake force by moving the drag armature C D up or down upon the spindle S, to which it is secured. This drag armature consists of a combined cylinder C and disk D which are fastened together. The object of using said disk is for the double purpose of being acted upon by the lines of force emanating from the pole pieces of the magnets R vertically, and for preventing said lines from short circuiting themselves over the top or upper edge of the cylinder, due to the reactive or repelling action of the eddy or Foucault currents developed within said cylinder. Since this action increases directly as the speed, it is at once evident that the number of lines of force of these magnets cutting the armature would otherwise decrease as the speed of the cylinder C increased, if some means were not provided for its prevention. I also find that the distance of the limbs or poles of the magnets used in conjunction with this type of drag, give the best results when they are as close as possible to the drag cylinder, and not to exceed a distance on either side of half the thickness of said moving cylinder. I further find that to obtain an absolutely even drag the distance between the poles of the drag magnets and the armature or closed conductor must be constant under all conditions. For this reason meters using a Foucault current drag, wherein the variations of retardation are effected by varying the distance of the poles of the magnets to or from the armature, thereby causing variations in the resistance of the magnetic circuit to alter the density of the field, have never been successful.

Another feature of my invention is, that the number of magnets R may be varied to alter the drag, thereby making it possible to use a very strong field, which I find advisable, in that it tends to reduce the errors arising from solid and other frictions.

The object of making the magnetic field strong, so that the drag may be as great as possible will be seen from the following: Let F be the strength of the field of the series coils, and C the current through the armature and representing the electromotive force, the turning moment is then proportional to F C. The resisting moment is a small nearly constant term $a$ due to the solid friction; a term $b\,n$ due to the friction of the brushes upon the commutator in which $n$ is the number of revolutions per second, and a very important term, $c\,F^2\,n$ representing the Foucault current drag on which great reliance can be placed. We have then $$F\,C = a + b\,n + c\,F^2\,n, \text{ or, } C = \frac{a}{F} + \frac{b}{F}n + c\,F\,n.$$

It is, therefore, obvious that by making the drag as great as possible or increasing F, the terms $\frac{a}{F} + \frac{b}{F}n$ become less important in comparison with $c\,F\,n$.

To make a meter accurate there must be a law underlying it. It must be made to give a straight line law; or in other words, a meter must be based on laws in accordance with which it moves its registering train at a speed proportionate to the current or power passing through it as the case may be. It must not follow some other law and be manipulated until it gives readings which may be nearly right, but are probably still very far from being truthful, as is the case with a number of meters at present in use.

The Arago brake and all other arrangements involving Foucault currents, take torques proportional to the speed, and power proportional to the square of the speed; not torque proportional to the square of the speed and power proportional to the cube, or to the speed, as is frequently incorrectly stated.

The theory of my improved energy meter will now be easily understood from the following considerations. The motor as provided, has its armature wound with fine wire and excited with a shunt current, and its fields excited by the main current. Since the field is proportional to the current being consumed, and the armature current to the pressure, the driving force or torque is proportional to the product of these two factors viz: ampères and volts; the driving force may be stated as being proportional to the rate of doing work. The work done in any given time is then proportional to the watts or rate of doing work and the speed. Now in a constant field the electromotive force generated in the damping or dragging armature C D, varies directly as the speed; and since said electromotive force acts through a constant resistance, the eddy or Foucault currents will also vary directly as the speed, hence the work done by the damper is proportional to the square of the revolutions. The work supplied by the motor armature is proportional to the driving force and to the speed as before stated, but the driving force varies as the product of the ampères and electromotive force; hence the work supplied or consumed in a given time varies as the watts and the speed; but it has been shown that the work done is proportional to the square of the speed, hence it follows that the speed is proportional to the watts or rate of doing work.

In standardizing the meter, a low initial speed is used, being one revolution per minute per sixty watts; hence each revolution of the armature represents sixty watts multiplied by one minute or sixty watt-minutes, which are equivalent to one watt hour or three thousand six hundred volt-coulombs or joules. This rate of speed can be made very much lower if necessary, such as in the case of meters having a high load unit or supply capacity. The advisability of having the speed of meters as low as possible has long been recognized, since it reduces the wear upon the jewel and the other parts of the mechanism subject to friction.

In employing the condenser, which is one of the other features of my invention, the sparking which takes place between the brushes and the commutator is entirely eliminated. This sparking has given more trouble than any other defect, and perhaps more than any other cause, has prevented the universal adoption of the recording Watt or Joule meter for light and power distribution. Up to the present time, the only metal that could be used in making the commutator, with any fair degree of success was pure silver, but this is found to rapidly become black and tarnished to such an extent, that, it soon introduces a serious increase in the resistance of the armature circuit, thereby reducing the torque and readings of the meter. Again as this oxidizing or tarnishing increases rapidly with time, the sparking will also increase in nearly the same ratio, so that eventually it necessitates having the brushes and commutator cleaned and repolished at short intervals, which is something to be discouraged, in order to keep the expense of maintaining the same as small as possible. In repolishing the brushes and commutator, unless done by an expert, other and more complicated difficulties arise, such as altering the tension of the brushes upon the commutator, this in itself showing considerable of a variation upon one and two lights. Again, particles of the metal composing the segments are liable to get in between them if crocus cloth strips are used for cleaning, thereby short-circuiting one or more of the coils, which will perceptibly reduce the torque, since it depends upon the product of the ampère turns in the armature, and in the fields or series coils. By my application of the condenser, I can use a commutator of either nickel, aluminium, copper nickel or silver plated, or platinum, or their alloys. I further find that aluminium alloyed with copper or silver gives excellent results. This sparking and blackening of the segments when used without a condenser I also find to be more marked when the meter is measuring on direct current circuits, due no doubt to the discharge of the extra current when the circuit is broken, or the passing of the brushes from one segment to another. It is obvious that the sparking will also produce a self inductive effect within the armature circuit, thereby causing a varied or interrupted current flow. There being two fundamentally different systems of supply i. e. by continuous or direct currents, and by alternating currents, the employment of a condenser makes it possible to use my improved meter with either of these systems without having to specially standardize it for either of them. In the case of direct or continuous currents, if E be the potential difference or pressure in volts, and represented by the current through the armature at any instant, and C the current in ampères at that instant through the series fields or coils, then E C is the power or rate of doing work, or the rate at which energy is being supplied in watts; and if $t$ is the time in hours during which the rate is kept up, then E C $t$ is the total quantity of energy in Watt hours used by the consumer or expended in the work circuit in the time $t$. When measuring the energy on alternating current circuits, the element of self-induction introduces itself, and must be eliminated before the reading of a meter can be taken as correct; for, in this case, if the mean current and the mean pressure be multiplied together the product is not necessarily the power absorbed. If the current lags behind the pressure as it will in the armature circuit when no condenser is used, the current maximum does not occur at the same instant as the pressure maximum, and the registration is less than that obtained by multiplying together the mean pressure and the mean current. Taking the same units as before, if E be the maximum pressure represented by the current in the armature, C the maximum ampères or current in the series fields, and $\varphi$ the angle of lag of the current behind the pressure in the armature, then the readings $=\dfrac{E\,C}{2}\cos\varphi$. Therefore, by eliminating the lag due to inductance, the registration will be the same as with a direct or continuous current, or E C.

Thus far I have only mentioned the lag taking place in the armature circuit, since that in the series coils or field is negligible, particularly if the current supplied is for incandescent lamps which are of a noninductive character. I also use in lieu of a condenser to prevent sparking, a noninductive or other discharge circuit of high resistance, connected between the brush terminals. This I find particularly applicable to meters subjected to mechanical vibration.

The sectional elevation shown in Fig. 3 has an inverted cup C for the drag armature, or, it is the same as shown in Figs. 1 and 2 with the exception of the upper or disk part which does not extend or project beyond the circumference of the cylinder. This armature may be made of any good conducting metal, but preferably those having the least resistance, such as silver, copper or aluminium; the latter I have found to give excellent results since its current density and retarding moment is more than double that of copper, weight for weight. A compound cylinder, consisting of an iron cylinder placed between two others made from any of the metals named, may be used and with which a very effective drag is obtained; the iron cylinder tending to increase the flux through the two other or outside cylinders, also acting as a good check against motion when no light or power are in use, due to the action of the magnets holding the iron cylinder in position or at rest by attraction. This motion referred to on no lights, is frequently produced by mechanical vibration, or jarring in places where meters are often installed, particularly when such meters have a constant auxiliary exciting current aiding the series coils, either by a special shunt winding, or the current of the armature circuit, to overcome the friction and inertia of the moving parts. I have also used a cylinder made with slots cut through it to reduce the weight and give the eddy currents a more defined path for circulation. These slots are made having their length in the same plane as the vertical magnets, and usually reach to within the upper and lower edges of the cylinder by a distance equal to the space between any two of said slots around said cylinder. In the compound cylinder the two non-magnetic ones may also be slotted. When it becomes necessary, from any cause, to remove the dragging device, it is easily accomplished by simply unscrewing the screw V which holds it in position upon the base W, and drawing the saw-toothed clamps P out until they become disengaged from the corresponding saw teeth on the edge of the disk U. The clamps P, P are screwed on bosses cast upon the base W and are adjustable thereon by means of the slots $p$, which are shown in Fig. 4.

In Fig. 4 which is a plan of Fig. 3, is also shown the manner in which the saw-teeth $s$ of P and P mesh with those marked $u$ of the supporting disk U which carries the magnets R, when the necessary drag is obtained. The upper part D of the drag armature has five holes shown, which are punched or drilled out to reduce the weight.

I do not here limit myself to the sawtooth construction shown for holding the magnets in position, as others, such as friction clamps or their equivalent may be used.

Fig. 5 shows another form of my improved retarding device, which consists of several laminated iron or steel electro magnets, suitably bent and riveted together in any convenient manner, or as shown by the rivets $r$. They are held in position around the disk U by having screws pass through suitable holes punched out at their neutral point, and screwing into the nut $v$ placed underneath the exciting coil $t$. The exciting coil $t$ is wound and insulated, then slipped down between the poles or limbs of the magnets R. It consists of turns enough so as to supersaturate the magnets, in order that their flux or density of field may remain constant under varying voltages, which circuits are subject to on account of variations of load affecting the speed of the generating apparatus. This however in practice rarely exceeds five per cent., but these coils are wound to maintain even flux and constant field at either an increase or decrease of ten or more per cent. This form of electro magnetic drag I find to solve the problem of keeping the strength of the retarding magnets constant, particularly when the meter is used with alternating currents, since there is nothing to alter with time. When permanent magnets are used it is only a matter of a few months until they gradually commence to demagnetize, due to the action of the alternating impulses of magnetism produced by the series coils. This demagnetization is further augmented by mechanical vibration, which is also due to the same cause. A condenser may be used in conjunction with this exciting coil if it becomes necessary to neutralize its inductance, such as making it applicable to the same voltage with a direct current system of supply, or if it is intended to be connected in series with the motor armature so as to reduce the constant loss taking place in the shunt circuits of the meter. The two terminals of the energizing coil $t$ can be connected to the transformer binding posts $a$ and $b$ or they may be connected to $c$ and $d$, so that the current taken by it will have to pass also through the series coils of the motor, thereby acting as an auxiliary field for the armature, to overcome the friction and difficulty of starting on very small loads.

Fig. 6 shows the method of connecting a two wire meter in circuit between the generator $n$ and the lamp or work circuit $l$. The leads from the transformer $n$ are connected to the two binding posts $a$ and $b$, and the wires running to the lamp circuit to the other two marked $c$ and $d$. The armature circuit is connected between the terminals $b$ and $d$, or it can be connected between $b$ on one side of the circuit and have the remaining end connected to the other side between the series field coils F as shown in Fig. 2 at $k$. In the former of these connections the whole of the armature current traverses the field coils while in the latter it traverses only one of said coils. By so doing an auxiliary torque is produced which also can be made and adjusted so as to entirely overcome the friction and inertia of the meter on starting. This again makes it possible for the meter to register correctly on very small loads and start on as low as one tenth of an ampère. It is obvious that this resistance to motion must be eliminated before the registry or proportionality of speed to load can be correct, since the starting force in a one hundred light meter with one lamp for instance, is only one hundreth part of the full load torque, and has this extra friction and inertia load to overcome which becomes almost negligible as the load increases. The condenser Y is coupled in multiple arc with the armature circuit as shown in the figure, but may be connected in various other ways well known and understood by those skilled in the art. The non-inductive resistance $m$ may be replaced by one or more incandescent lamps.

Fig. 7 shows the connections of a three wire meter measuring the energy given out by the generator $n$ and absorbed in the work circuit $l$. In this construction one of the fields is connected between two binding posts $a$ and $d'$, the other between $b'$ and $c$, with the neutral line or wire between $b$ and $d$. The armature and condenser are connected to the outside wires of the system at the left hand field F and the binding post $c$.

Fig. 8 is also a diagrammatic view showing the application of this meter for recording the energy consumed on circuits of high potential, such as measuring on the primary circuits of a central station during any given period. The field coils F are connected in series in the main circuit or primary of the generator supplying current to the several transformers $n$, a small transformer $q$ is used to energize the armature circuit of the meter and which is connected to the secondary terminals $t^3$ through the two inner binding posts $b$ and $c$. If the primary electromotive force is two thousand volts and the secondary of the transformer $q$ energizing the armature is fifty volts, then a constant of forty must be used in order to make the armature electromotive force equivalent in value to the primary electromotive force. The constant may be dispensed with by making the registering train increase the meter readings by that amount, thereby causing it to be direct reading.

In taking the meter apart for repairs it is only necessary to unscrew the cap nuts L and lift off the upper bar B carrying the registering train and brushes. After removing the tubes K, the supporting bar E carrying the field coils may next be removed, which will also carry the armature between them and the drag cylinder, which is also attached to the same spindle as the motor armature. To remove the magnets from the base remove the screw V when the upright post T carrying said magnets may be lifted out.

I do not hereby limit myself to the use or application of a condenser in connection with commutated motor meters, as I can apply it in like manner to any form of energy meter for measuring electric currents and consisting of a circuit or circuits used to represent the electromotive force in volts and subject to an impedance or lag due to self-induction.

The dial readings of the meter are made to read in either watt-hours, ampère-hours, lamp-hours or horsepower-hours. In the case of registering in watt-hours the dial is direct reading, but if it is necessary to sell light at a given price per lamp-hour, then the dial reading may be divided by the watts absorbed by one lamp, which would be equal to the number of lamps, times the number of hours in use. Suppose the reading of the meter was 5500 watt-hours, then the reading in lamp-hours would be equal to $5500 \div 50$ watts, or 110. The fifty watts is the energy absorbed per sixteen candle power lamp on the assumption that they consume 1.0 ampères at fifty volts. If sold at an ampère-hour rate then the reading in watt-hours is divided by the electromotive force of the circuit, or $5500 \div 50$ volts $= 110$ ampère-hours.

When used in measuring the energy supplied to motors in power distribution, the usual rate is at so much per horsepower-hour. In this case the reading of the meter is divided by the number of units or watts to the horsepower, which is seven hundred and forty-six, the result being the number of horsepower-hours, or, $5500 \div 746 = 7.37$ horsepower hours.

Again, the registering train can be made to read direct in any of these units by altering its mechanism to change its ratio of speed to the dial reading. Take for example a meter registering the energy supplied to a motor, its registering train can be made so as to indicate one horsepower-hour for every seven hundred and forty-six revolutions of the spindle, since each revolution is equal to one Watt hour.

In the foregoing description of my improved meter, reference has been made to its use and construction for constant potential circuits only. It can also be used to integrate the total energy on circuits of constant current and varying electromotive force, by passing the constant current through the armature and winding the field coils with fine wire and shunting them around the terminals of the system or source of supply. The constant current passing through the armature may be the whole of the current in use, or a constant part of it shunted around a suitable resistance, which takes up the extra current not passing through the armature.

The retarding device when the electro-magnets are used, may be energized also by the constant current or a shunted part of it, or the armature and said electro-magnetic drag magnets may be placed in multiple arc with each other and in series in the main circuit, having the resistance of their respective circuits so proportioned, that the smaller part of the current will traverse the armature circuit.

I do not confine myself to the special form of apparatus herein shown and described, but claim broadly the arrangement of parts in general as set forth, and they may be embodied in forms of construction such as shall be found in practice to be best suited to the end in view.

My improvement consists in the production of an accurate electric energy meter, suitable for alternating and direct currents, and provided with a condenser for eliminating the sparking at the brushes and also the inductance in the volt circuit, a Foucault current drag or brake for governing with accuracy the speed of the meter, and adjustable to any minute degree of retardation by the micrometric arrangement herein described. Further, its accuracy being maintained throughout its entire range, its simplicity of electrical and mechanical design, its economy of manufacture and maintenance, combined with its noiselessness and durability, are novel features of the highest value.

Having thus particularly pointed out and ascertained the nature of my invention and the manner of using the same, what I claim as my invention, and desire to secure by Letters Patent, is—

1. In an electric meter, the combination of a motor driven by the energy to be measured and a Foucault current drag or brake, consisting of the closed armature C, D, supported upon the shaft s and revoluble between the vertical poles or limbs of the micrometric adjustable magnets R, as and for the purpose herein set forth and described.

2. In an electric meter, the combination of a motor driven by the energy to be recorded, and a micrometric Foucault current drag or brake consisting of the vertically adjustable armature C, D, supported upon the motor armature shaft s and revoluble between the poles or limbs of the magnets R, as and for the purpose set forth and described.

3. In an electric meter, the combination of a motor driven by the energy to be recorded, and a drag or brake armature consisting of a disk and cylinder combination revoluble in a field of force established by the vertically adjustable magnets R, as and for the purpose herein set forth and described.

4. In an electric meter, the combination of a motor driven by the energy to be measured and a compound drag or brake armature revoluble with the motor spindle and within a constant field of force established by the vertically adjustable magnets R, as and for the purpose herein set forth.

5. In an electric meter, the combination of a motor whose series fields are connected in the work circuit and representing the current flow in ampères, and its armature circuit connected in multiple arc upon the mains of the supply system, and representing the electromotive force in volts between said mains of said system, and a condenser shunted around or connected to the terminals of said armature circuit, as and for the purpose set forth and described.

6. In an electric meter, the combination of a motor whose series field coils are connected in the work circuit and representing the current flow in ampères, and its armature circuit connected in multiple arc upon the mains of the supply system and representing the electromotive force in volts between said mains of said system, a condenser shunted around and connected to the terminals of the circuit or circuits containing self-induction, and a Foucault current drag consisting of a closed conductor moving through a constant field of force as and for the purpose herein described.

7. In an electric meter, the combination of a motor operated by the energy to be recorded, a condenser, a retarding device consisting of a closed conductor capable of rotation between the poles of one or more vertical magnets which are adjustable micrometrically, and a registering train, all substantially as set forth and described.

8. In an electric meter, the combination of a motor driven by the energy to be measured, a condenser, a retarding device consisting of a closed conductor capable of rotation between the poles of one or more vertical magnets which are adjustable micrometrically and the clamping devices P, P, which hold said magnets in position when the requisite retardation is obtained, all substantially as described.

9. In an electric meter consisting of a motor driven by the energy to be recorded, the combination of the herein described retarding device, a condenser shunted around the terminals of the volt circuit, the disk U holding the retarding magnets R, and adjustable upon a center coaxial with the limbs or poles of said magnets, and the supporting post T on which said disk and magnets are micrometrically adjusted to any vertical position, as and for the purpose herein described.

10. In an electric motor meter, the combination of a condenser, a Foucault current drag, the upright supporting post T, the disk U, the clamps P, P, the registering train G, and the spindle s carrying both the motor and drag armatures, also giving motion to said registering train to indicate the consumption of energy, all substantially as herein set forth and described.

11. In an electric meter for direct and alternating currents, the combination of a motor driven by the current or energy consumed and to be measured, a registering train operated by the rotation of the armature, and a damping or retarding device, consisting of a closed conductor mounted upon the armature shaft, and revolving therewith, between the poles of magnets which constitute or maintain a constant field of force, said magnets being secured to a common support and turning upon the threaded upright post T for the purpose herein described.

12. In an electric meter for measuring the energy consumed in direct or alternating circuits, of varying current flow and constant potential, or constant current and varying potential, the combination of the motor armature revoluble in a field established by the embracing coils, the spindle s carrying said armature, the registering train G, the commutator H, the brushes J, the condenser Y, the resistance m, the supporting post T, the disk U, the magnets R, the clamps P, and the Foucault current drag consisting of a metallic cylinder closed at one end for the purpose set forth, and attached to the same spindle carrying the motor armature, and moving in a constant field of force established by one or more permanent magnets which are capable of producing a micrometric change in the retardation or brake force governing the speed of the motor, by being adjustable to any vertical position in the manner set forth, so that such variations in drag are due to the cylinder being rotated through more or less of the lines of force passing between the limbs of said vertical magnets, all substantially as herein set forth and described.

13. In an electric meter consisting of the herein described motive device, the combination of a high resistance discharge circuit shunted around the motor terminals or brushes for the purpose set forth, a commutator secured to and revolving with the spindle, a registering train, and a Foucault current drag or brake having a permanent or constant field of force acting upon a closed revoluble and adjustable conductor moving in inductive proximity thereto, as and for the purpose herein set forth.

14. In an electric energy or joulemeter consisting of a motor operated by the energy passing through it and to be measured, the combination of a commutator of nickel, aluminium, or their alloys, a high resistance discharge circuit shunted around the armature terminals or brushes, a condenser, a registering train or mechanism, and a retarding device governing the revolutions of the spindle actuating said recording mechanism, and consisting of an adjustable closed armature moving in inductive proximity to a multiplicity of magnets, maintaining a constant field of force to act upon said armature, and micrometrically adjustable for the purpose set forth and herein described.

In testimony whereof I affix my signature, in the presence of two witnesses, at Fort Wayne, Indiana, this 25th day of July, 1893.

THOMAS DUNCAN.

Witnesses:
   THOMAS J. LOGAN,
   RUFUS G. MARCY.